(12) United States Patent
Siddappa et al.

(10) Patent No.: US 11,086,684 B2
(45) Date of Patent: *Aug. 10, 2021

(54) METHODS AND APPARATUS TO MANAGE COMPUTE RESOURCES IN A HYPERCONVERGED INFRASTRUCTURE COMPUTING ENVIRONMENT

(71) Applicant: VMware, Inc., Palo Alto, CA (US)

(72) Inventors: Gireesha Udagani Siddappa, Bangalore (IN); Samdeep Nayak, Bangalore (IN); Ravi Kumar Reddy Kottapalli, Bangalore (IN); Srinivas Sampatkumar Hemige, Bangalore (IN); Shubham Verma, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,819

(22) Filed: Jun. 15, 2020

(65) Prior Publication Data

US 2020/0310877 A1    Oct. 1, 2020

Related U.S. Application Data

(63) Continuation of application No. 16/133,742, filed on Sep. 18, 2018, now Pat. No. 10,684,893, which is a (Continued)

(30) Foreign Application Priority Data

Feb. 25, 2017   (IN) .............................. 201741006740
Jul. 3, 2018    (IN) .............................. 201841024777

(51) Int. Cl.
    G06F 15/173   (2006.01)
    G06F 9/50     (2006.01)
(Continued)

(52) U.S. Cl.
    CPC .......... *G06F 9/505* (2013.01); *G06F 9/45558* (2013.01); *G06F 9/5077* (2013.01);
(Continued)

(58) Field of Classification Search
    USPC ........................ 709/226, 214, 216, 212, 213
    See application file for complete search history.

(56) References Cited

U.S. PATENT DOCUMENTS

| 8,255,915 B1 | 8/2012 | Blanding et al. |
| 8,724,848 B1 | 5/2014 | Heath et al. |

(Continued)

OTHER PUBLICATIONS

United States Patent and Trademark Office, "Notice of Allowance," mailed in connection with U.S. Appl. No. 15/587,439, dated Jun. 21, 2019, 10 pages.

(Continued)

*Primary Examiner* — Lan Dai T Truong
(74) *Attorney, Agent, or Firm* — Hanley, Flight & Zimmerman, LLC

(57) ABSTRACT

Methods, apparatus, systems and articles of manufacture are disclosed for managing compute resources in a computing environment. Examples disclosed herein include identifying (i) needy workloads and (ii) offering workloads in the computing environment. Disclosed examples also include selecting a first one of the offering workloads to lend resources to a first one of the needy workloads. Disclosed examples further include causing a host associated with the first one of the offering workloads to at least one of (i) instantiate a first virtual machine when the host is implemented with a second virtual machine or (ii) instantiate a first container when the host is implemented with a second container, and assigning the first virtual machine or the first container to the first one of the needy workloads.

20 Claims, 7 Drawing Sheets

Related U.S. Application Data continuation-in-part of application No. 15/587,439, filed on May 5, 2017, now Pat. No. 10,462,221.

(51) Int. Cl.
*G06F 9/455* (2018.01)
*H04L 29/08* (2006.01)

(52) U.S. Cl.
CPC ...... *H04L 67/1012* (2013.01); *H04L 67/1031* (2013.01); *G06F 2009/45575* (2013.01); *G06F 2009/45587* (2013.01)

(56) References Cited

U.S. PATENT DOCUMENTS

| | | | |
|---|---|---|---|
| 9,553,771 | B1 | 1/2017 | McKenna et al. |
| 9,929,780 | B2 | 3/2018 | Abbondanzio et al. |
| 10,027,596 | B1 | 7/2018 | Harwood |
| 10,083,051 | B1 | 9/2018 | Mahapatra et al. |
| 2006/0184349 | A1 | 8/2006 | Goud et al. |
| 2007/0143629 | A1 | 6/2007 | Hardjono et al. |
| 2008/0271034 | A1 | 10/2008 | Miyata |
| 2008/0275975 | A1 | 11/2008 | Pandey et al. |
| 2010/0101339 | A1 | 4/2010 | Tatsutani et al. |
| 2011/0055588 | A1 | 3/2011 | DeHaan |
| 2011/0276951 | A1 | 11/2011 | Jain |
| 2011/0298607 | A1 | 12/2011 | Priyantha et al. |
| 2012/0137289 | A1 | 5/2012 | Nolterieke et al. |
| 2012/0180055 | A1 | 7/2012 | Brech et al. |
| 2013/0219068 | A1 | 8/2013 | Ballani et al. |
| 2013/0223684 | A1 | 8/2013 | Townend et al. |
| 2014/0006862 | A1 | 1/2014 | Jain et al. |
| 2014/0055248 | A1 | 2/2014 | Hammelbacher |
| 2014/0298091 | A1 | 10/2014 | Carlen et al. |
| 2015/0009013 | A1 | 1/2015 | Cartwright et al. |
| 2015/0067294 | A1 | 3/2015 | Hu et al. |
| 2015/0098608 | A1 | 4/2015 | Hintermeister et al. |
| 2015/0234617 | A1 | 8/2015 | Li et al. |
| 2015/0341220 | A1 | 11/2015 | Sikand et al. |
| 2015/0370583 | A1 | 12/2015 | Shah et al. |
| 2015/0370587 | A1 | 12/2015 | Kureha et al. |
| 2016/0299957 | A1 | 10/2016 | A. C. et al. |
| 2016/0337446 | A1 | 11/2016 | Abali et al. |
| 2016/0380815 | A1 | 12/2016 | Agarwal et al. |
| 2017/0255494 | A1 | 9/2017 | Bartfai-Walcott et al. |
| 2017/0286252 | A1 | 10/2017 | Illikkal et al. |
| 2017/0293447 | A1 | 10/2017 | Bivens et al. |
| 2018/0248949 | A1 | 8/2018 | Siddappa et al. |
| 2018/0295036 | A1 | 10/2018 | Krishnamurthy et al. |
| 2019/0034237 | A1 | 1/2019 | Siddappa et al. |
| 2019/0235902 | A1 | 8/2019 | Wei et al. |
| 2019/0278663 | A1 | 9/2019 | Mehta et al. |
| 2020/0036791 | A1 | 1/2020 | Siddappa et al. |

OTHER PUBLICATIONS

United States Patent and Trademark Office, "Non-final Office Action," mailed in connection with U.S. Appl. No. 15/587,439, dated Dec. 21, 2018, 49 pages.

United States Patent and Trademark Office, "Notice of Allowance," mailed in connection with U.S. Appl. No. 16/133,742, dated Feb. 7, 2020, 14 pages.

United States Patent and Trademark Office, "Non-final Office Action," mailed in connection with U.S. Appl. No. 16/133,742, dated Aug. 22, 2019, 28 pages.

Kovar, "Softward-Defined Data Centers: Should You Jump on the Bandwagon?" CRN, May 13, 2013, 16 pages. Retrieved from https://www.crn.com/news/data-center/240154576/software-defined-data-centers-should-you-jump-on-the-bandwagon.htm.

United States Patent and Trademark Office, "Notice of Allowance," mailed in connection with U.S. Appl. No. 16/594,912, dated Dec. 11, 2020, 9 pages.

United States Patent and Trademark Office, "Non-final Office Action," mailed in connection with U.S. Appl. No. 16/594,912, dated Aug. 13, 2020, 17 pages.

METHODS AND APPARATUS TO MANAGE COMPUTE RESOURCES IN A HYPERCONVERGED INFRASTRUCTURE COMPUTING ENVIRONMENT

RELATED APPLICATION(S)

This patent arises from a continuation of U.S. patent application Ser. No. 16/133,742 (now U.S. Pat. No. 10,684,893), which is titled "METHODS AND APPARATUS TO MANAGE COMPUTE RESOURCES IN A HYPERCONVERGED INFRASTRUCTURE COMPUTING ENVIRONMENT," and which was filed on Sep. 18, 2018, which claims priority to Indian Patent Application Serial No. 201841024777, which was filed on Jul. 3, 2018. U.S. patent application Ser. No. 16/133,742 is also a continuation-in-part of U.S. patent application Ser. No. 15/587,439 (now U.S. Pat. No. 10,462,221), which is titled "DISTRIBUTED STORAGE RESOURCE MANAGEMENT IN A HYPER CONVERGED INFRASTRUCTURE," and which was filed on May 5, 2017, which claims priority to Indian Patent Application Serial No. 201741006740, which was filed on Feb. 25, 2017. U.S. patent application Ser. No. 16/133,742 and U.S. patent application Ser. No. 15/587,439 are hereby incorporated herein by reference in their respective entireties.

FIELD OF THE DISCLOSURE

This disclosure relates generally to computing environments, and, more particularly, to methods and apparatus to manage compute resources in a hyperconverged infrastructure computing environment.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). More recently, hybrid cloud computing platforms have been developed. Hybrid cloud platforms refers to the ability of an enterprise to operate an enterprise application in a private and a public environment. Hyperconverged infrastructures are yet another step in the evolution of virtual computing system. Hyperconverged systems include dynamic software defined compute infrastructure that are virtual not only in the compute realm but also in the storage, networking and security realms.

As the types of virtual compute environments evolve, ways to manage the distributed resources are also evolving. Workload domains are one such management resource concept used in the world of hyperconverged compute systems. Workload domains are physically isolated containers that hold a group of enterprise applications having similar performance, availability, and security requirements. When a workload is to be created, requirements of application(s) are translated into a number of servers having sufficient CPU, memory and storage capacity to support the applications. A workload having the required number of servers is then assigned to the workload domain. As (and/or if) more capacity is needed (whether CPU, memory and/or storage capacity), one or more additional servers are added to the workload domain.

DETAILED DESCRIPTION

Figure 1:
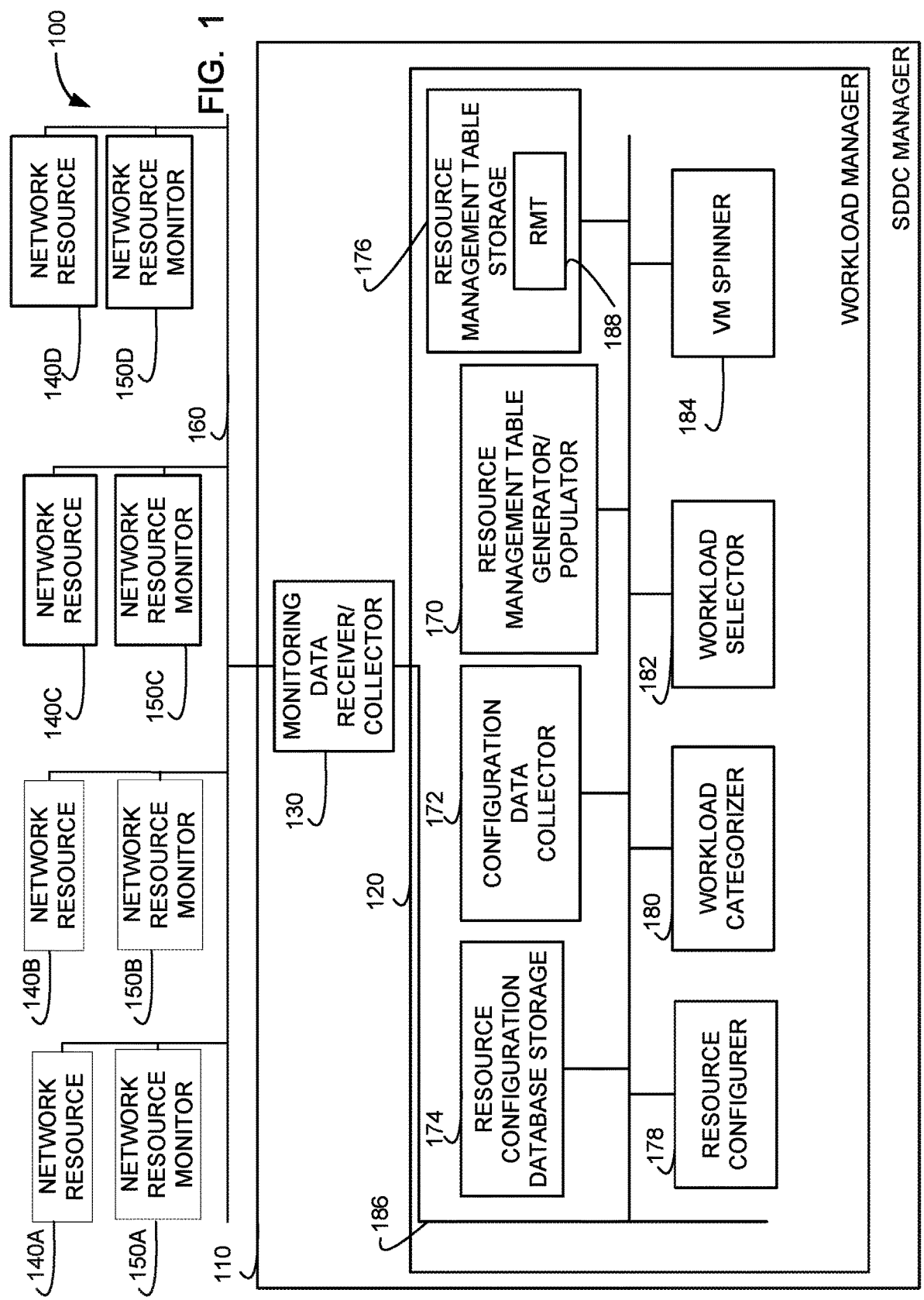
FIG. 1 is an example virtual and/or containerized computing environment that includes an example software defined data center to implement an example workload manager in accordance with the teachings of this disclosure.

Enterprises that have migrated to a hyperconverged compute infrastructure often deploy workload domains to support enterprise applications. A workload domain (also referred to herein as a workload) provides compute, memory and storage resources to support execution of a set of enterprise applications having similar performance, availability, and security requirements. Each workload is assigned a number of servers/nodes that are needed to support the CPU, memory and storage capacity requirements of the applications included in the workload. If more resources are needed to support a group of applications, more servers are assigned to support the associated workload domain.

Although resource management based on the concept of the workload domain operates well in many circumstances, the workload domain technique can be somewhat rigid and inflexible thereby resulting in underutilization of the compute, memory and/or storage resources. Consider a system in which three servers have a CPU capacity of 168 GHz, 2 TB of memory, and 8 TB of storage. Consider, in the same system, a workload domain containing applications that require 172 GHz of CPU capacity, 2 TB of memory, and 8 TB of storage. In such a system, a workload domain having three servers would fall 4 GHz short of the needed CPU capacity of 172 GHz. Thus, to operate the applications successfully, a workload domain having four servers would need to be created. Unfortunately, such a workload domain having four servers would include 52 GHz of unused CPU capacity, as well as significant quantities of unused memory and storage capacity. Thus, the inability to disaggregate (below the server level) the resources available to be added to a workload domain below the server level often results in wasted CPU, memory and/or storage capacity, Methods and apparatus disclosed herein dynamically provide compute, memory and storage resources to work load domains form a common pool of disaggregated compute shared resources. In some examples, the methods and apparatus include a resource manager that tracks the workload resources. In some examples, the resource manager is implemented using a Software Defined Data Center (SDDC) manager and the SDDC manager uses a resource management table to track resources that are currently assigned to a workload domain and to track resources that are not yet assigned to a workload domain. The SDDC manager identifies workloads that are in need to additional resources (e.g., workload domains that are needy) and further identifies workload domains that have an abundance of resources (e.g., workload domains that have additional resources to "offer" to another workload domain, also referred to as "offering" workload domains). In some examples, the SDDC manager spins one or more additional virtual machines having an amount of capacity that meets the shortcomings of the needy workload domain using resources from the offering workload domain. In some examples, the SDDC manager uses considers compute resource availability, current workload performance, security information and networking efficiency to determine which of a set of offering workloads will be used to spin new virtual machines for support of needy workloads. The methods and apparatus described herein result smarter and less wasteful utilization of CPU, memory and storage resources.

Examples disclosed herein can be used in connection with different types of Software Defined Data Centers ("SDDCs"). In some examples, techniques described herein are useful for managing network resources that are provided in SDDCs based on Hyper Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

FIG. 1 is a block diagram of an example computing environment 100 having a Software Defined Data Center Manager 110 that includes an example workload manager 120 and an example monitoring data receiver/collector 130. According to the illustrated example, the monitoring data receiver/collector 130 is coupled to example network resources 140A-140D and corresponding example network resource monitors 150A-150D via an example network 160. In some examples, any or all of the network resources 140A-140D, the network resource monitors 150A-150D and/or the network 160 are virtual resources. In some examples, the network resources can include virtual compute resources, virtual memory resources and/or virtual storage resources. The network resource monitors 150A-150D monitor the operation of the corresponding network resources 140A-140D and provide monitoring data to the monitoring data receiver/collector 130. The monitoring data receiver/collector 130 supplies all or portions of the monitoring data to the example workload manager 120.

In some examples, the example workload manager 120 includes an example resource manager table generator/populator 170, an example configuration data collector 172, an example resource configuration database 174, an example resource management table storage 176, an example resource configurer 178, an example workload categorizer 180, an example workload selector 182, and an example virtual machine ("VM") spinner 184 coupled via a communication bus 186. In some examples, the monitoring data received from the network resources monitors includes information about the operation of the network resources and, in particular, information identifying which of the network resources are heavily utilized and which are under-utilized. In some examples, the network resources 140A-140D are implemented with a set of servers (also referred to as nodes) and one or more of the servers are grouped into workload domains. In some such examples, the servers in a same workload domain are used to support a set of applications. In some examples, the set of applications are included in a same workload domain because the applications have common features, common characteristics, similar operating needs, similar security needs, etc. The number of servers selected for inclusion in a workload domain is based on the amount of CPU capacity, memory capacity, and storage capacity needed to support the set of applications. In some examples, the information supplied by the network resource monitors 150A-150D about the network resources/servers 140A-140D identifies the total amount of CPU capacity, the total amount of memory capacity, and the total amount of storage capacity included in each workload domain (based on the number of servers included in the workload domain). In some such examples, the information supplied by the network resource monitors 150A-150D to the monitoring data receiver/collector 130 further identifies the amount of the total CPU capacity currently being used by the workload domain, the amount of the total memory capacity currently being used by the workload domain, and the amount of storage capacity currently being used by the workload domain. In some cases, the information may reflect that a workload domain is in need of more CPU capacity, memory capacity, or storage capacity such that the workload domain is referred to as a "needy workload domain." In other cases, the monitoring information may reflect that the workload domain has unused CPU capacity, memory capacity and/or storage capacity such that the workload domain has capacity to offer up for usage by other workload domains, and as such, is referred to as an "offering workload domain."

In some examples, the example monitoring data receiver/collector 130 periodically causes the network resource monitors 150A-150D to poll a set of servers included in a set of workload domains for capacity availability and capacity usage information. In some examples, information identifying the servers/network resources included in each of the workload domains is stored in the example resource configuration database storage 174. The example monitoring data receiver/collector 130 reviews the workload domain information stored in the resource configuration database storage to identify the servers/network resources to be polled. The monitoring data receiver/collector 130 supplies the poll results to the example resource management table generator/populator 170 which uses the monitoring information to generate and/or populate an example resource management table ("RMT") 188 stored in the example resource management table storage 176. In some examples, the resource management table 188 can include information identifying each workload, the servers/network resources included in each workload, a total amount of CPU capacity, a total amount of memory capacity, and a total amount of storage capacity included in each workload. In some examples, for each workload, the resource management table 188 may further be populated with information about the characteristics of each workload including security needs/requirements of the workload, performance needs of the workload, the type of workload (e.g., production versus test), networking accessibility of the workload, etc.

In some examples, the example workload categorizer 180 reviews the information stored in the RMT 188 and, based on the information contained in the RMT 188, categorizes each workload as being either a needy workload or an offering workload. In some examples, the workload categorizer 180 determines that a workload is a needy workload when one or more of the operating requirements of the workload are not being met. A needy workload may be categorized as needy when a threshold amount (e.g., greater than 95%) of the total CPU capacity is being used, when a threshold amount (e.g., greater than 95%) of the memory capacity is being used, when a threshold amount (e.g., greater than 95%) of the storage capacity is being used, etc. The workload categorizer stores the categorizing information in the RMT 188 in association with each of the workloads. In some examples, the workload categorizer may use any number of categories to characterize the workloads. For example, the workload categorizer 172 may categorize a workload as very needy, slightly needy, abundantly offering, narrowly offering, etc., based on the level of capacity available or not available. In some examples, the example workload categorizer notifies the example workload selector 182 when a workload is deemed a needy workload. In some examples the workload selector may monitor the RMT 188 for workloads categorized as needy workloads. In response to a workload being categorized as a needy workload, the workload selector 182 reviews the workloads categorized as offering workloads with a view to selecting one of the offering workloads to donate capacity for the needy workload. The workload selector 182 may select an offering workload to donate capacity to a needy workload based on any number of factors including: the amount of available capacity of the offering workload, the needs of the applications included in the needy workload, a creation and enforcement policy that governs workload domains, the loading of other offering workloads, etc. Additionally, if multiple workloads are determined to be needy workloads, the type of workload may be a factor used to determine which of the needy workloads will receive additional capacity from an offering workload. For example, a production workload determined to be a needy workload may be given higher priority for receiving additional capacity than a test workload determined to be a needy workload. In some examples, the workload selector 182 selects a needy workload to receive additional resources from an offering workload in response to a request for resources received from the needy workload.

In some examples, the workload selector 182 upon selecting a needy workload to receive additional resources (either based on the neediness of the workload or based on a request for resources from the needy workload) from an offering workload will identify an amount of additional resources that are needed. The workload selector 182 may identify the amount of additional resources that are needed based on information supplied by needy workload and/or based on a statistical analysis of the resources currently being consumed versus an amount of resources currently allotted to the needy workload. In some examples, the needy workload, upon consuming a threshold amount of allotted resources, may identify a need for additional resources to the workload selector 182. The threshold amount can be determined based on a static value or on a dynamic analysis of the resources being consumed across multiple workloads. The workload selector 182 then selects one of the offering workloads to lend resources to the needy workload. In some examples, the workload selector notifies the example resource configurer 178 that the amount of identified resources are to be lent from the selected offering workload to the needy workload. In response, the resource configurer 178 instructs the VM Spinner 184 to send an instruction to the offering workload to spin an Esxi virtual machine having the amount of additional resources (e.g., CPU capacity, memory capacity, storage capacity) identified by the workload selector 182, to associate the Esxi virtual machine with the workload in the resource configuration database 174, and to disassociate the Esxi virtual machine from the offering workload. In some examples, the resource configurer 178 takes any other steps needed to ensure that the newly spun Esxi virtual machine has network connectivity to the needy workload and also notifies the needy workload of the additional resources. As a result of adding additional resources, the needy workload is no longer needy.

Figure 2:
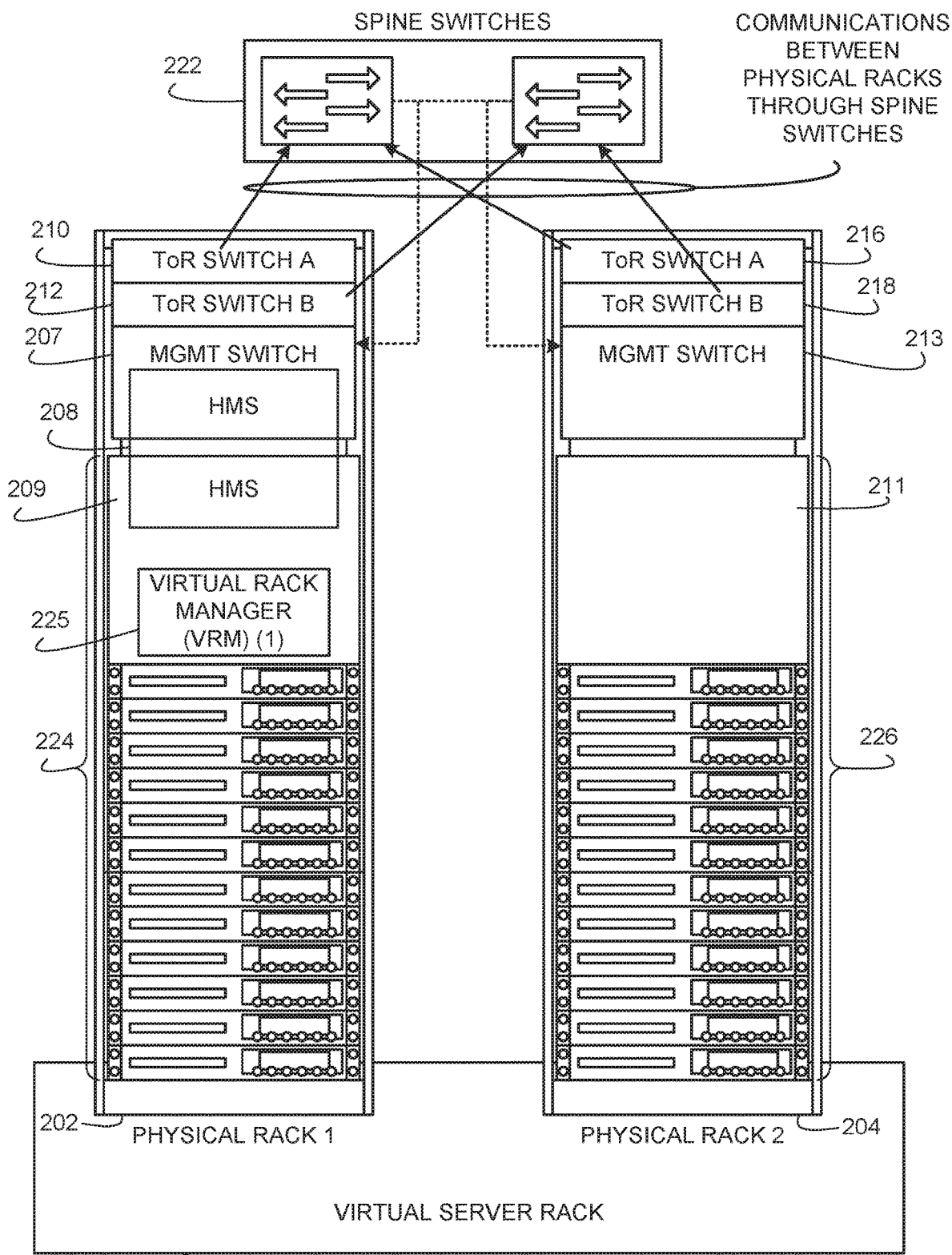
FIG. 2 depicts example physical racks in the example virtual server rack deployment.

FIG. 2 depicts example physical racks 202, 204 in an example deployment of a virtual server rack 206. The virtual server rack 206 of the illustrated example enables abstracting hardware resources (e.g., physical hardware resources 224, 226). In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more VMware ESXi™ clusters along with a logical storage pool and network connectivity. In examples disclosed herein, a cluster is a server group in a virtual environment. For example, a VMware ESXi™ cluster is a group of physical servers in the physical hardware resources that run ESXi™ hypervisors to virtualize processor, memory, storage, and networking resources into logical resources to run multiple virtual machines that run operating systems and applications as if those operating systems and applications were running on physical hardware without an intermediate virtualization layer.

In the illustrated example, the first physical rack 202 has an example top-of-rack (ToR) switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In some examples, the switches 106A, 106B, 106C are implemented using any of the ToR switch A 210, the ToR switch A 216, the ToR switch B 212, the ToR switch B 218, the spine switches 212, etc.

In the illustrated example, the HMS 208 connects to server management ports of the server host node(0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. In the illustrated example, the ToR switches 210, 212, 216, 218, implement leaf switches such that the ToR switches 210, 212, 216, 218, and the spine switches 222 are in communication with one another in a leaf-spine switch configuration. These example connections form a non-routable private Internet protocol (IP) management network for out-of-band (OOB) management. The HMS 208 of the illustrated example uses this OOB management interface to the server management ports of the server host node(0) 209, 211 for server hardware management. In addition, the HMS 208 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) 222 (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208 is provided with in-band (IB) connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

Example OOB operations performed by the HMS 208 include discovery of new hardware, bootstrapping, remote power control, authentication, hard resetting of non-responsive hosts, monitoring catastrophic hardware failures, and firmware upgrades. The example HMS 208 uses IB management to periodically monitor status and health of the physical resources 224, 226 and to keep server objects and switch objects up to date. Example IB operations performed by the HMS 208 include controlling power state, accessing temperature sensors, controlling BIOS (Basic Input/Output System) inventory of hardware (e.g., CPUs, memory, disks, etc.), event monitoring, and logging events.

The HMSs 208 of the corresponding physical racks 202, 204 interface with the virtual rack manager (VRM) 225 of the first physical rack 202 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRM 225 of the first physical rack 202 runs on a cluster of three server host nodes of the first physical rack 202, one of which is the server host node(0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. In the illustrated example, the VRM 225 of physical rack 1 202 communicates with the physical rack 2 204 through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

The VRM 225 of the first physical rack 202 runs on a cluster of three server host nodes of the first physical rack 202 using a high availability (HA) mode configuration. Using the HA mode in this manner, enables fault tolerant operation of the VRM 225 in the event that one of the three server host nodes in the cluster for the VRM 225 fails. Upon failure of a server host node executing the VRM 225, the VRM 225, can be restarted to execute on another one of the hosts in the cluster. Therefore, the VRM 225 continues to be available even in the event of a failure of one of the server host nodes in the cluster.

In examples disclosed herein, a command line interface (CLI) and APIs are used to manage the ToR switches 210, 212, 216, 218. For example, the HMS 208 uses CLI/APIs to populate switch objects corresponding to the ToR switches 210, 212, 216, 218. On HMS bootup, the HMS 208 populates initial switch objects with statically available information. In addition, the HMS 208 uses a periodic polling mechanism as part of an HMS switch management application thread to collect statistical and health data from the ToR switches 210, 212, 216, 218 (e.g., Link states, Packet Stats, Availability, etc.). There is also a configuration buffer as part of the switch object which stores the configuration information to be applied on the switch.

The HMS 208 of the illustrated example of FIG. 2 is a stateless software agent responsible for managing individual hardware resources in a physical rack 202, 204. Examples of hardware elements that the HMS 208 manages are servers and network switches in the physical rack 202, 204. In the illustrated example, the HMS 208 is implemented using Java on Linux so that an OOB management portion of the HMS 208 runs as a Java application on a white box management switch (e.g., the management switch 207, 213) in the physical rack 202, 204. However, any other programming language and any other operating system may be used to implement the HMS 208.

Figure 3:
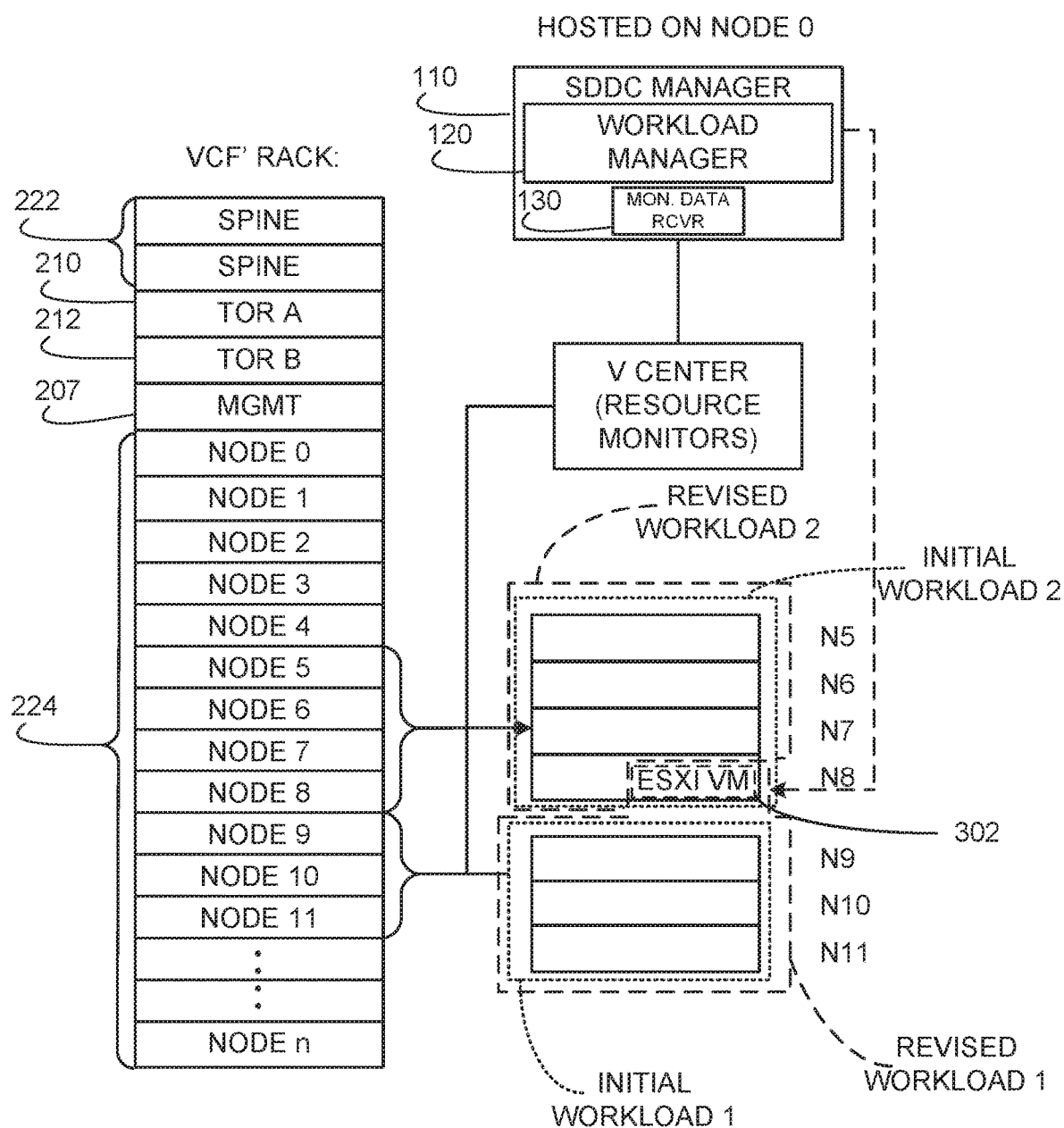
FIG. 3 depicts an example first workload and an example second workload hosted in one of the example physical racks of FIG. 2.

FIG. 3 depicts an example first workload, WORKLOAD 1, and an example second workload, WORKLOAD 2, hosted in the first physical rack, Rack 1 202, of FIG. 2. In the illustrated example of FIG. 3, WORKLOAD 1 initially includes server nodes N9, N10, and N11 and WORKLOAD 2 initially includes server nodes N5, N6, N7, N8. In response to WORKLOAD 1 becoming needy and requesting additional resources, the workload manager 120, causes node 8 to spin an Esxi virtual machine 302 and causes the Esxi virtual machine to be assigned to WORKLOAD 1. As a result of the operation of the workload manager 120, revised WORKLOAD 1 includes node 9, node 10, node 11 and the Esxi virtual machine 302 of node 8, and the revised WORKLOAD 2 includes node 5, node 6, node 7 and node 8 minus the Esxi virtual machine 302.

Figure 4:
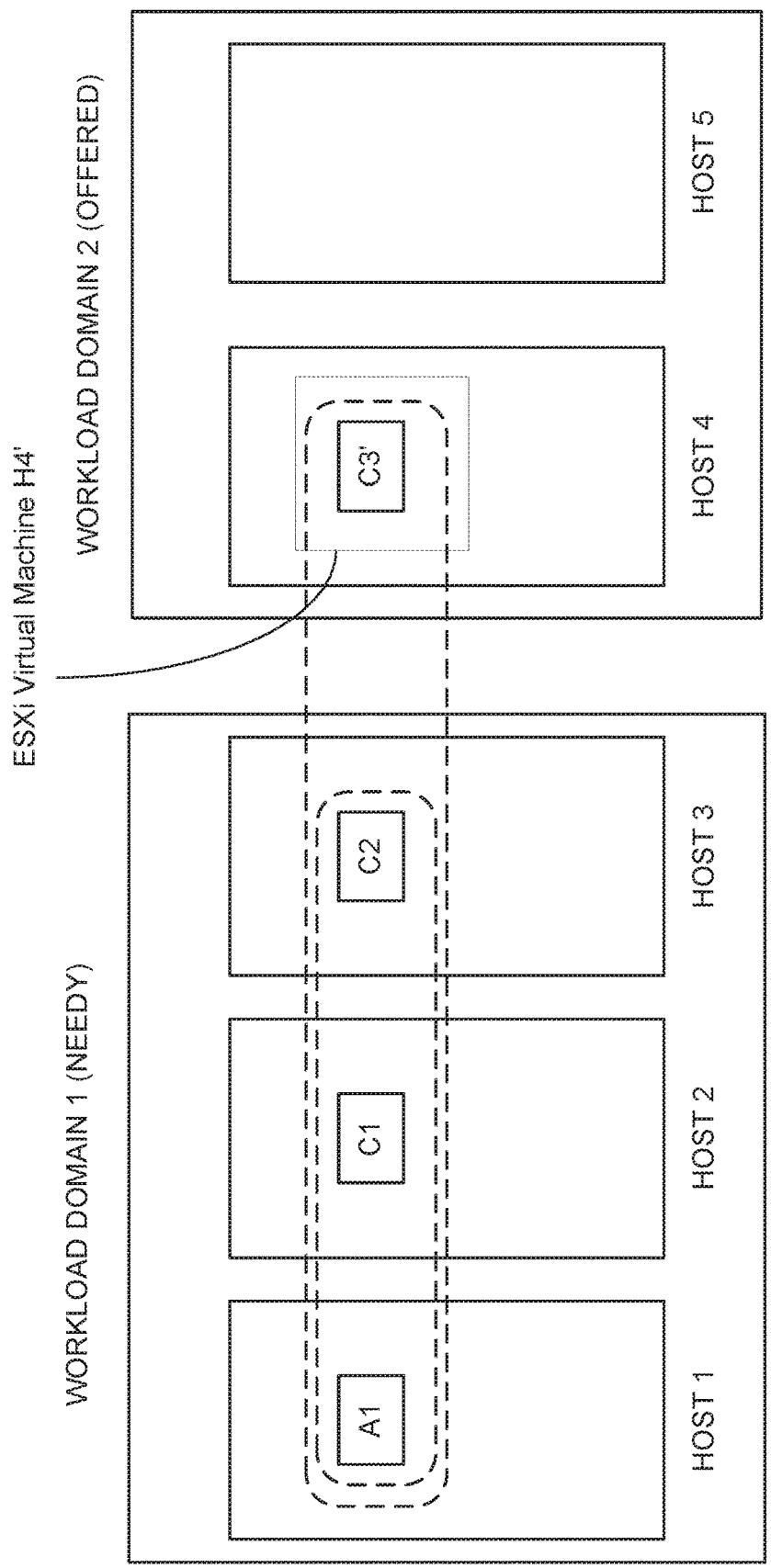
FIG. 4 depicts an example first workload domain and an example second workload domain in a containerized computing environment.

FIG. 4 depicts an example first workload, WORKLOAD 1, and an example second workload, WORKLOAD 2, in a container-based virtual environment. In the illustrated example of FIG. 4, WORKLOAD 1 is initially supported by a virtual integrated container appliance, A1, of a first virtual container host V1 including HOST 1, HOST 2, and HOST 3, a first virtual integrated container C1, and a second virtual integrated container, C2. WORKLOAD 2 is initially supported by HOST 4 and HOST 5. In response to WORKLOAD 1 becoming needy and requesting additional resources, the workload manager 120 (see FIG. 1 and FIG. 2), causes the fourth host, HOST 4, to spin a ESXi virtual machine H4' and assign it to needy WORKLOAD 1, thereby associating H4' to virtual container host V1. Further, vSphere integrated container C3' can be spun on H4' as a part of virtual container host V1. As a result of the operation of the workload manager 120, revised WORKLOAD 1 is supported by the virtual integrated container appliance, A1, the first virtual integrated container C1, the second virtual integrated container, C2, and the third virtual integrated container, C3', and WORKLOAD 2 is supported by the fourth host, HOST 4 (minus ESXi virtual machine H4'), and the fifth host, HOST 5. In some examples, after the ESXi virtual machine H4' becomes a part of the (formerly needy workload) the ESXi virtual machine H4' can host additional Kubernetes Nodes and Pods for an already existing Kubernetes deployment. A Kubernetes Pod is a group of one or more containers (such as Docker containers), with shared storage/network, and includes a specification for how to run the containers. A "Kubernetes Node" is virtual machine that can host a collection of pods. Docker is a container platform that enables the building of a container based data center, and a Docker container refers to a container instantiated on a Docker container platform.

In some examples, the example virtual integrated container appliance A1 can be implemented using a vSphere integrated container appliance. In some examples, the virtual integrated containers C1, C2, and C3' can be implemented using vSphere integrated containers offered by VMware. In some examples, the virtual container hosts are deployed as a "vApp" in a virtual data center cluster that is backed by a resource pool. A "vApp" is a preconfigured virtual machine that packages applications and parameters that define operational details and that packages applications with their required operating systems. The vApp allows identification of container virtual machines that are provisioned for the virtual container hosts. In some examples, a first virtual machine deployed in a vApp provides a secure Docker compatible API endpoint and other services for the virtual container host to operate.

While an example manner of implementing the workload manager 120 is illustrated in FIG. 1, one or more of the elements, processes and/or devices illustrated in FIG. 1 may be combined, divided, re-arranged, omitted, eliminated and/or implemented in any other way. Further, the example resource management table generator/populator 170, the example configuration data collector 172, the example resource configuration database storage 174, the example resource management table storage 176, the example resource management table "RMT" 188, the example workload categorizer 180, the example workload selector 182, the example resource configurer 178, the example VM spinner 184, and/or, more generally, the example workload manager 120 of FIG. 1 may be implemented by hardware, software, firmware and/or any combination of hardware, software and/or firmware. Thus, for example, any of the example resource management table generator/populator 170, the example configuration data collector 172, the example resource configuration database storage 174, the example resource management table storage 176, the example resource management table "RMT" 188, the example workload categorizer 180, the example workload selector 182, the example resource configurer 178, the example VM spinner 184, and/or, more generally, the example workload manager 120 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example resource management table generator/populator 170, the example configuration data collector 172, the example resource configuration database storage 174, the example resource management table storage 176, the example resource management table "RMT" 188, the example workload categorizer 180, the example workload selector 182, the example resource configurer 178, and/or the example VM spinner 184 is/are hereby expressly defined to include a non-transitory computer readable storage device or storage disk such as a memory, a digital versatile disk (DVD), a compact disk (CD), a Blu-ray disk, etc. including the software and/or firmware. Further still, the example workload manager 120 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
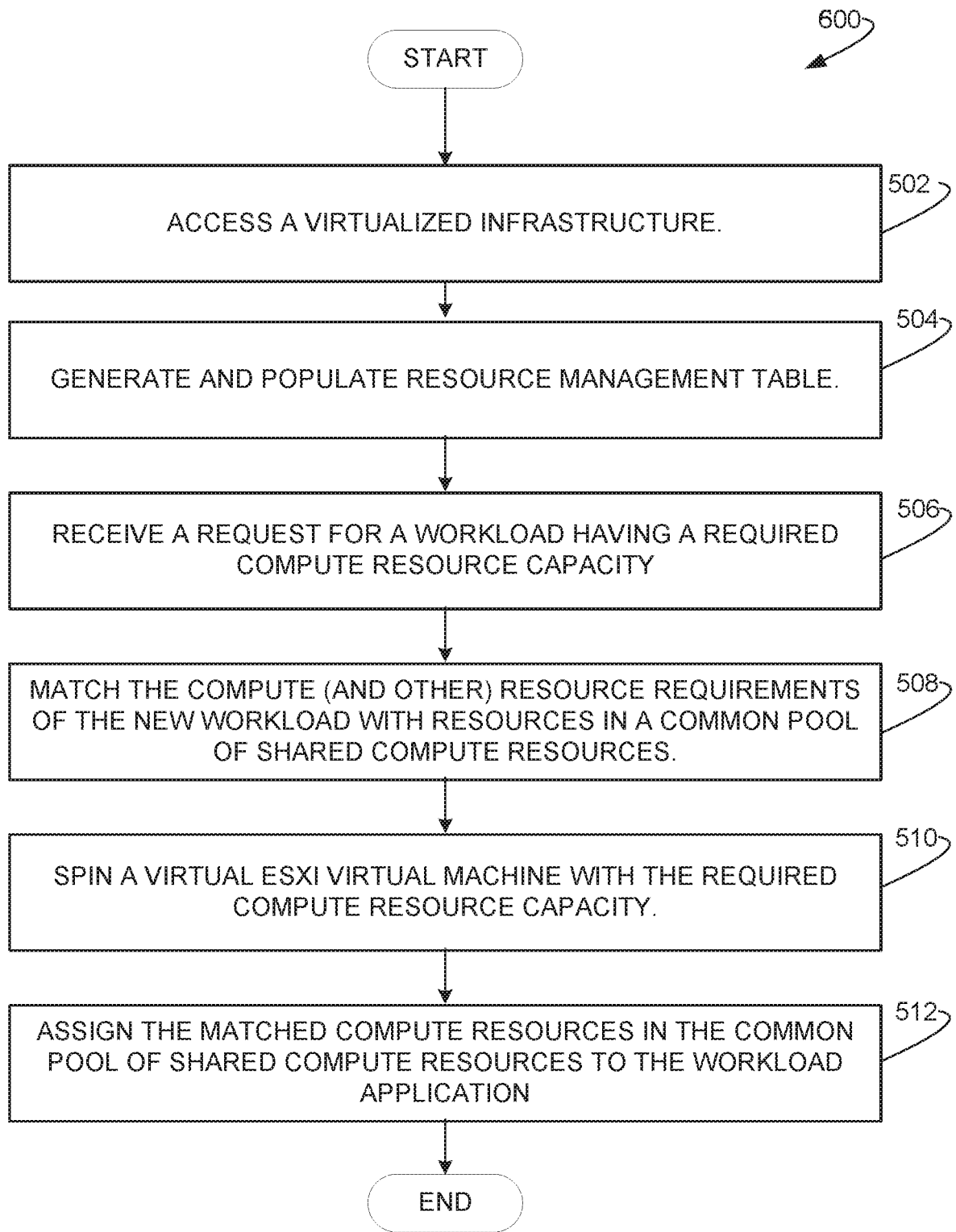
FIG. 5 is a flow chart representative of example machine readable instructions which may be executed to implement the example workload manager of FIG. 1.

A flowchart representative of example hardware logic or machine readable instructions for implementing the workload manager 120 of FIG. 1, and FIG. 3, is shown in FIG. 5. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example workload manager 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 500 of FIG. 5 begins at block 502 when the example monitoring data receiver/collector 130 causes the set of network resource monitors 150A, 150B, 150C, 150D to periodically (or aperiodically) poll the network resources 140A, 140B, 140C, 140D, for information. In response to the polling, the network resources supply operating information that can include a total amount and a used amount of compute capacity, a total amount and a used amount of memory capacity, a total amount and a used amount of storage capacity, an operating speed, a security level or other security feature/characteristic, information about whether the network resource is operating in a production mode or a test mode, information about the efficiency of the network resource, accessibility of the network resource, etc. In some examples, information identifying the servers/network resources 140A, 140B, 140C, 140D, included in each of the workload domains is stored in the example resource configuration database storage 174 and the monitoring data receiver/collector 130 reviews the workload domain information stored in the resource configuration database storage to identify the servers/network resources to be polled.

The monitoring data receiver/collector 130 supplies the poll results received from the network resources to the example resource management table generator/populator 170 which uses the monitoring information to generate and/or populate an example resource management table ("RMT) 188 (see FIG. 1) (see block 504). In some examples, the RMT 188 is stored in the example resource management table storage 176 (see FIG. 1). In some examples, the resource management table 188 can include information identifying each workload, the servers/network resources included in each workload, a total amount of CPU capacity included in each workload, a total amount of memory capacity included in each workload, and a total amount of storage capacity included in each workload. In some examples, for each workload, the resource management table 188 may further be populated with information about the characteristics of each workload including security needs/requirements of the workload, performance needs of the workload, the type of workload (e.g., production versus test), networking accessibility of the workload, etc.

In some examples, the example workload categorizer 180 reviews the information stored in the RMT 188 and, based on the information contained in the RMT 188, categorizes each workload as being either a needy workload or an offering workload (also at the block 504). As described above in connection with FIG. 1, in some examples, the workload categorizer 180 determines that a workload is a needy workload when one or more of the operating requirements of the workload are not being met. A needy workload may be categorized as needy when a threshold amount (e.g., greater than 95%) of the total CPU capacity is being used, when a threshold amount (e.g., greater than 95%) of the total memory capacity is being used, when a threshold amount (e.g., greater than 95%) of the total storage capacity is being used, etc. The workload categorizer stores the categorizing information in the RMT 188 in association with each of the workloads. In some examples, the workload categorizer may use any number of categories to characterize the workloads. For example, the workload categorizer 172 may categorize a workload as very needy, slightly needy, abundantly offering, narrowly offering, etc., based on the level of capacity available or not available.

In some examples, when a new workload is to be created, the example resource configurer 178 receives a request for the creation of new workload having a required compute (and memory and storage) capacity (see block 506). Such a request can be generated, for example, by a system administrator (or other user) via an input device 722 (see FIG. 7). In response to the request, the resource configurer 178 identifies a common pool of shared resources to be used to support the new workload and selects a portion of the common pool of shared resources to support the new workload application (see block 508). In some examples, the resource configurer 178 identifies the common pool of shared resources by accessing the resource configuration database 174 and/or instructing the configuration data collector 172 to collect (via the monitoring data receiver/collector 130 and the network resource monitors) information about available network resources. In some examples, when there are multiple common pools of shared resources that have different features/characteristics, the resource configurer 178 matches the compute, memory and storage requirements of the new workload (and any other attributes of the new workload, if needed) to identify which common pool of shared resources is to be used to support the new workload (see also block 508).

In some examples, the resource configurer 178 then instructs the example VM Spinner 184 (see FIG. 1) to send an instruction to a host/server/node/container associated with the selected common pool of shared resources instructing the host/server/node/container to spin an Esxi virtual machine (or to spin another container) having the amount of required additional resources (e.g., CPU capacity, memory capacity, storage capacity) (see block 510). In addition, the resource configurer 178 associates/assigns the newly spun Esxi virtual machine (or container) with the new workload in the resource configuration database 174, and disassociates the newly spun Esxi virtual machine (or virtual container) from the common pool of shared resources (see block 512) in the resource configuration database 174. In some examples, the resource configurer 178 takes any other steps needed to ensure that the newly spun Esxi virtual machine (or virtual container) has network connectivity to the underlying host/server/node/container on which the newly spun Esxi virtual machine (or virtual container) has been instantiated. After the resource configurer 178 has completed the process of association/disassociation described above, the process for adding a new workload (e.g., the program/method 500) ends.

Figure 6:
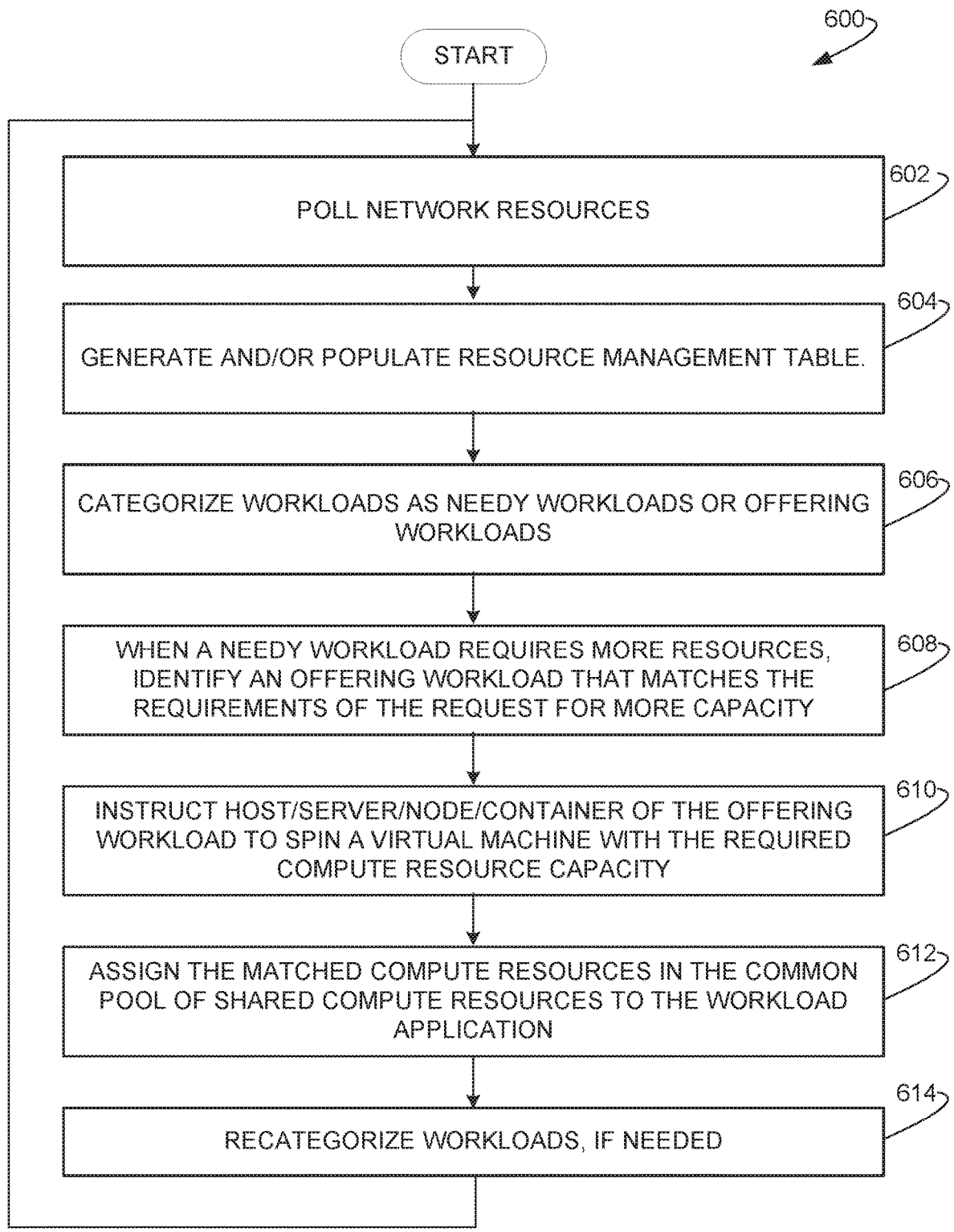
FIG. 6 is a flow chart representative of example machine readable instructions which may be executed to implement the example workload manager of FIG. 1.

A flowchart representative of example hardware logic or machine readable instructions for implementing the example resource manager 120 of FIG. 1, and/or FIG. 3 is shown in FIG. 6. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example resource manager 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program 600 of FIG. 6 begins at block 602 when the example monitoring data receiver/collector 130 causes the set of network resource monitors 150A, 150B, 150C, 150D to periodically (or aperiodically) poll the network resources 140A, 140B, 140C, 140D, for information. In response to the polling, the network resources supply operating information that can include a total amount and a used amount of compute capacity, a total amount and a used amount of memory capacity, a total amount and a used amount of storage capacity, an operating speed, a security level or other security feature/characteristic, information about whether the network resource is operating in a production mode or a test mode, information about the efficiency of the network resource, accessibility of the network resource, etc. In some examples, information identifying the servers/network resources 140A, 140B, 140C, 140D, included in each of the workload domains is stored in the example resource configuration database storage 174 and the monitoring data receiver/collector 130 reviews the workload domain information stored in the resource configuration database storage to identify the servers/network resources to be polled.

The monitoring data receiver/collector 130 supplies the poll results received from the network resources to the example resource management table generator/populator 170 which uses the monitoring information to generate (if needed) and populate and/or update an example resource management table ("RMT) 188 (see FIG. 1) (see block 604). In some examples, the RMT 188 is stored in the example resource management table storage 176 (see FIG. 1). In some examples, the resource management table 188 can include information identifying each workload, the servers/network resources included in each workload, a total amount of CPU capacity included in each workload, a total amount of memory capacity included in each workload, and a total amount of storage capacity included in each workload. In some examples, for each workload, the resource management table 188 may further be populated with information about the characteristics of each workload, including: the security needs/requirements of the workload, the performance needs of the workload, the type of workload (e.g., production versus test), the networking accessibility of the workload, etc.

In some examples, the example workload categorizer 180 reviews the information stored in the RMT 188 and, based on the information contained in the RMT 188, categorizes each workload as being either a needy workload or an offering workload (see block 606). As described above in connection with FIG. 1, in some examples, the workload categorizer 180 determines that a workload is a needy workload when one or more of the operating requirements of the workload are not being met. A needy workload may be categorized as needy when a threshold amount (e.g., greater than 95%) of the total CPU capacity is being used, when a threshold amount (e.g., greater than 95%) of the total memory capacity is being used, when a threshold amount (e.g., greater than 95%) of the total storage capacity is being used, etc. The workload categorizer stores the categorizing information in the RMT 188 in association with each of the workloads. In some examples, the workload categorizer may use any number of categories to characterize the workloads. For example, the workload categorizer 172 may categorize a workload as very needy, slightly needy, abundantly offering, narrowly offering, etc., based on the level of capacity available or not available.

In some examples, when an existing workload requires additional resources (e.g., additional computer, memory, and/or storage resources), the example workload selector 182, identifies an offering workload that matches the requirements/features/characteristics of the existing (needy) workload (see block 608). In some examples, the workload selector 182 identifies the offering workload by accessing the RMT 188 and/or the resource configuration database storage 174. In some examples, the workload selector 182 matches the compute, memory, and storage requirements of the needy workload (and any other attributes of the needy workload, if needed) with features/characteristics of the offering workload block. In some examples, the existing (needy) workload indicates the need for additional resources by sending a request to the resource configurer 178 which, in turn, notifies the workload selector 182. In some examples, any of the workload selector 182, workload categorizer 180, and/or the resource configurer 178 are designed to monitor the level of neediness of the needy workload identified in the RMT 188 and to generate a request for additional resources on behalf of a needy workload when a threshold level of neediness is reached.

In some examples, the resource configurer 178 then instructs the example VM Spinner 184 (see FIG. 1) to send an instruction to a host/server/node/container associated with the selected offering workload instructing the host/server/node/container to spin an Esxi virtual machine (or to spin a virtual container, depending on whether the workload is designed using virtual containers or virtual machines) having the amount of required additional resources (e.g., CPU capacity, memory capacity, storage capacity) (see block 610). In addition, the resource configurer 178 associates/assigns the newly spun Esxi virtual machine (or virtual container) with the new workload in the resource configuration database 174, and disassociates the newly spun Esxi virtual machine (or virtual container) from the common pool of shared resources (see block 612) in the resource configuration database 174. In some examples, the resource configurer 178 takes any other steps needed to ensure that the newly spun Esxi virtual machine (or virtual container) has network connectivity to the underlying host/server/node/container on which the newly spun Esxi virtual machine (or virtual container) has been instantiated (also at the block 612). After the resource configurer 178 has completed the process of association/disassociation described above, the workload categorizer 180 re-categorizes the affected offering workload and needy workload involved in the resource lending transaction, if needed, and the process/method returns to again poll the network resources (at the block 602). It should be understood that, although shown as a sequential part of the method/program 600, the operation of polling the network resources can be a process that is repeatedly run in the background (and or coextensively with) the remaining operations of the program/method 600. Likewise, the operation to update/populate the RMT table (block 604) and the operation to categorize the workloads (block 606) may be performed in a coextensive/background manner with respect to the remaining operation of the program/method 600.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 7:
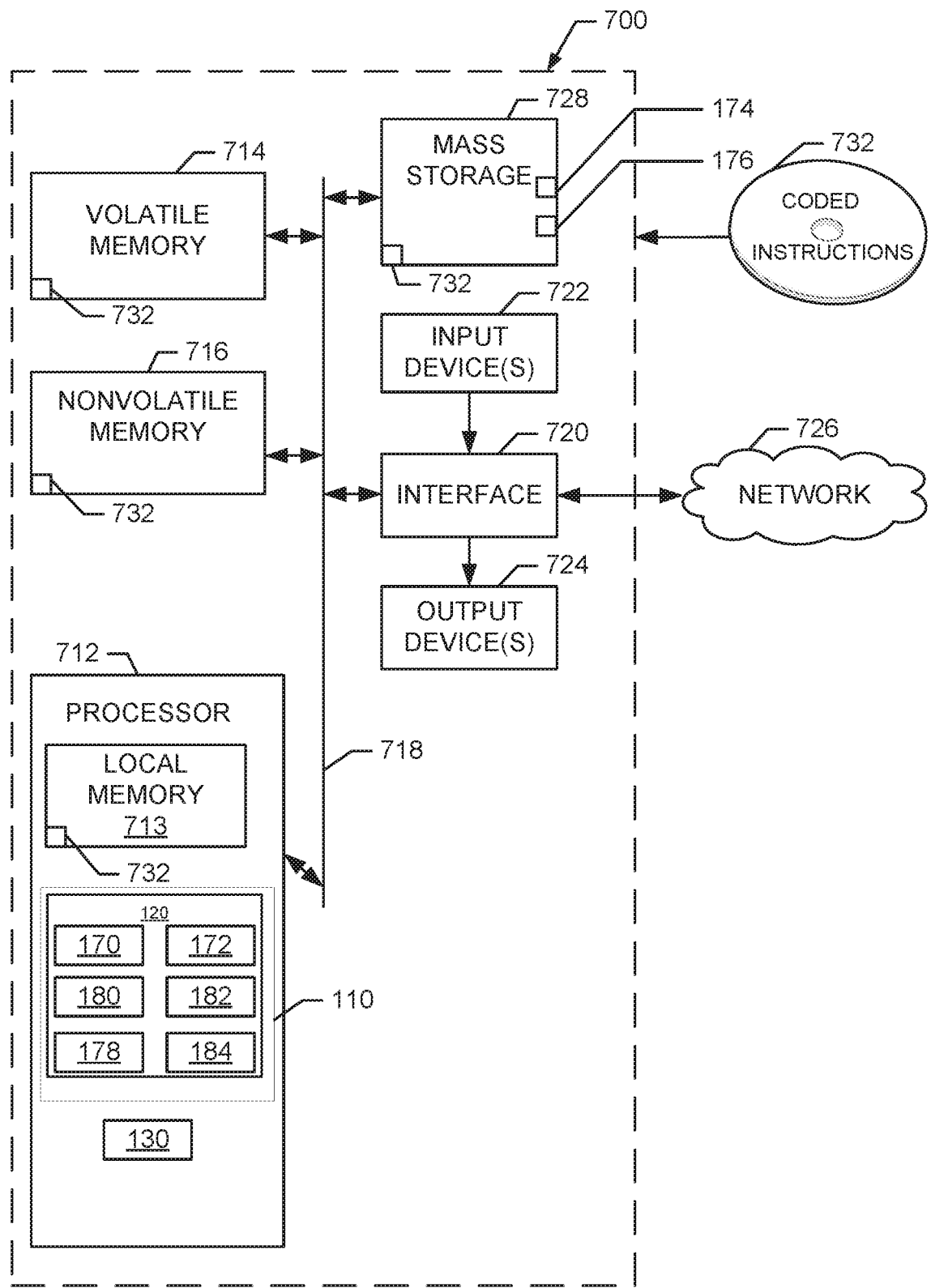
FIG. 7 is a block diagram of an example processor platform capable of executing the instructions of FIGS. 5 and 6 to implement the example workload manager 120 and Software defined data center 110 of FIG. 1.

FIG. 7 is a block diagram of an example processor platform 700 structured to execute the instructions of FIG. 5 and FIG. 7 to implement the workload manager 120 of FIG. 1, FIG. 2, and/or FIG. 3. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example resource management table generator/populator 170, the example configuration data collector 172, the example workload categorizer 180, the example workload selector 182, the example resource configurer 178, and the example VM spinner 184. The processor 712 can also implement the example Software defined data center 110.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. In some examples, the network 726 implements the example network 160 of FIG. 1.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. The example mass storage 728 includes the example resource configuration database storage 174, and the example resource management table storage 176.

The machine executable instructions 732 of FIG. 7 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that provide greater flexibility to resource management in the world of virtual and/or containerized computing. In some examples, the resource management operations disclosed herein improve resource management by allowing compute, memory and storage capacity to be utilized in a disaggregated manner (e.g., by allowing resources associated with a host/server/node/container to be divided among different workloads). The resulting advantages include greater utilization of network resources and less waste of network resources.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage workload resources in a computing environment, the apparatus comprising:
 a workload categorizer to identify (i) needy workloads and (ii) offering workloads in the computing environment;
 a workload selector to select a first one of the offering workloads to lend resources to a first one of the needy workloads; and
 a resource configurer to:
  cause a host associated with the first one of the offering workloads to at least one of (i) instantiate a first virtual machine when the host is implemented with a second virtual machine or (ii) instantiate a first container when the host is implemented with a second container; and
  assign the first virtual machine or the first container to the first one of the needy workloads, at least one of the workload categorizer, the workload selector or the resource configurer implemented by at least one of hardware or at least one processor.

2. The apparatus of claim 1, wherein the workload categorizer is to identify the first one of the needy workloads when at least a threshold amount of at least one resource associated with the first one of the needy workloads is utilized.

3. The apparatus of claim 2, wherein the at least one resource includes at least one of processor capacity, memory capacity or storage capacity.

4. The apparatus of claim 1, wherein the workload selector is to select the first one of the offering workloads based on an amount of available capacity associated with the first one of the offering workloads and a characteristic of the first one of the needy workloads.

5. The apparatus of claim 1, wherein the workload selector is to prioritize the first one of the needy workloads over a second one of the needy workloads based on a type of the first one of the needy workloads and a type of the second one of the needy workloads.

6. The apparatus of claim 1, further including a resource manager table populator to populate a resource management table with information identifying workloads in infrastructure computing environment.

7. The apparatus of claim 6, wherein the workload categorizer is to identify the needy workloads and the offering workloads based on the information includes in the resource management table.

8. A non-transitory computing readable medium comprising computer readable instructions that, when executed, cause at least one processor to at least:
 identify (i) needy workloads and (ii) offering workloads in a computing environment;
 select a first one of the offering workloads to lend resources to a first one of the needy workloads;
 cause a host associated with the first one of the offering workloads to at least one of (i) instantiate a first virtual machine when the host is implemented with a second virtual machine or (ii) instantiate a first container when the host is implemented with a second container; and
 assign the first virtual machine or the first container to the first one of the needy workloads.

9. The non-transitory computing readable medium of claim 8, wherein the instructions cause the at least one processor to identify the first one of the needy workloads when at least a threshold amount of at least one resource associated with the first one of the needy workloads is utilized.

10. The non-transitory computing readable medium of claim 9, wherein the at least one resource includes at least one of processor capacity, memory capacity or storage capacity.

11. The non-transitory computing readable medium of claim 8, wherein the instructions cause the at least one processor to select the first one of the offering workloads based on an amount of available capacity associated with the first one of the offering workloads and a characteristic of the first one of the needy workloads.

12. The non-transitory computing readable medium of claim 8, wherein the instructions cause the at least one processor to prioritize the first one of the needy workloads over a second one of the needy workloads based on a type of the first one of the needy workloads and a type of the second one of the needy workloads.

13. The non-transitory computing readable medium of claim 8, wherein the instructions cause the at least one processor to populate a resource management table with information identifying workloads in the computing environment.

14. The non-transitory computing readable medium of claim 13, wherein the instructions cause the at least one processor to identify the needy workloads and the offering workloads based on the information includes in the resource management table.

15. A method to manage workload resources in a computing environment, the method comprising:
    identifying (i) needy workloads and (ii) offering workloads in a computing environment;
    selecting, by executing an instruction with at least one processor, a first one of the offering workloads to lend resources to a first one of the needy workloads;
    causing, by executing an instruction with at least one processor, a host associated with the first one of the offering workloads to at least one of (i) instantiate a first virtual machine when the host is implemented with a second virtual machine or (ii) instantiate a first container when the host is implemented with a second container; and
    assigning the first virtual machine or the first container to the first one of the needy workloads.

16. The method of claim 15, wherein the identifying includes identifying the first one of the needy workloads when at least a threshold amount of at least one resource associated with the first one of the needy workloads is utilized.

17. The method of claim 16, wherein the at least one resource includes at least one of processor capacity, memory capacity or storage capacity.

18. The method of claim 15, wherein the selecting includes selecting the first one of the offering workloads based on an amount of available capacity associated with the first one of the offering workloads and a characteristic of the first one of the needy workloads.

19. The method of claim 15, further including populating a resource management table with information identifying workloads in the computing environment.

20. The method of claim 19, wherein the identifying includes identify the needy workloads and the offering workloads based on the information includes in the resource management table.

* * * * *